US012753321B2

(12) United States Patent
Wang et al.

(10) Patent No.: US 12,753,321 B2
(45) Date of Patent: Oct. 6, 2026

(54) AQUEOUS DISPERSION OF POLYMER PARTICLES, MICROSPHERES, AND COLLOIDAL SILICA PARTICLES

(71) Applicants: Dow Global Technologies LLC, Midland, MI (US); Rohm and Haas Company, Collegeville, PA (US)

(72) Inventors: Caifeng Wang, Shanghai (CN); Jianming Xu, Shanghai (CN); Kok Chiew Poh, Singapore (SG); Yuehan Hu, Shanghai (CN); Tao Wang, Highton (AU); Juan F. Callejas, Audubon, PA (US); Philip R. Harsh, Birdsboro, PA (US); James C. Bohling, Lansdale, PA (US); Andrew J. Swartz, Fleetwood, PA (US); Partha S. Majumdar, Harleysville, PA (US); Joseph Tanzer, Ft. Washington, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 345 days.

(21) Appl. No.: 18/016,465

(22) PCT Filed: Jul. 31, 2020

(86) PCT No.: PCT/CN2020/106102

§ 371 (c)(1),
(2) Date: Jan. 17, 2023

(87) PCT Pub. No.: WO2022/021283

PCT Pub. Date: Feb. 3, 2022

(65) Prior Publication Data

US 2023/0312969 A1 Oct. 5, 2023

(51) Int. Cl.

*C09D 133/08* (2006.01)
*C09D 7/40* (2018.01)
*C09D 7/61* (2018.01)
*C09D 7/65* (2018.01)

(52) U.S. Cl.

CPC ............ *C09D 133/08* (2013.01); *C09D 7/61* (2018.01); *C09D 7/65* (2018.01); *C09D 7/67* (2018.01); *C09D 7/69* (2018.01); *C09D 7/70* (2018.01); *C08K 2201/005* (2013.01); *C08K 2201/011* (2013.01)

(58) Field of Classification Search

CPC .......... C09D 133/08; C09D 7/61; C09D 7/65; C09D 7/67; C09D 7/69; C09D 7/70; C09D 133/12; C09D 5/024; C08K 2201/005; C08K 2201/011

See application file for complete search history.

(56) References Cited

U.S. PATENT DOCUMENTS

| | | | | |
|---|---|---|---|---|
| 5,258,424 | A * | 11/1993 | Yagi | C04B 41/009 523/220 |
| 2006/0106142 | A1 | 5/2006 | Kim et al. | |
| 2015/0152282 | A1* | 6/2015 | Wang | C08K 3/22 524/521 |
| 2018/0327562 | A1 | 11/2018 | Beshah et al. | |
| 2019/0185687 | A1* | 6/2019 | Bohling | C09D 7/43 |

FOREIGN PATENT DOCUMENTS

| | | |
|---|---|---|
| CN | 106947329 | 7/2017 |
| CN | 107761139 | 3/2018 |
| JP | 2000290464 A * | 10/2000 |

OTHER PUBLICATIONS

Sakurai, JP2000290464 (Year: 2000).*

* cited by examiner

*Primary Examiner* — Mark Eashoo
*Assistant Examiner* — Zhen Liu

(57) ABSTRACT

The present invention is a composition comprising an aqueous dispersion of polymer particles, polymeric organic crosslinked microspheres, and colloidal silica particles. The composition is useful in coating compositions for exterior applications to achieve a balance of excellent dirt pickup resistance and durability performance under accelerated testing conditions.

7 Claims, No Drawings

AQUEOUS DISPERSION OF POLYMER PARTICLES, MICROSPHERES, AND COLLOIDAL SILICA PARTICLES

BACKGROUND OF THE INVENTION

The present invention relates to a composition which is an aqueous dispersion of polymer particles, polymeric organic crosslinked microspheres, and colloidal silica particles. The composition is useful as an exterior coating composition.

Exterior coatings require excellent durability, color retention, and dirt pickup resistance (DPUR). The addition of an aqueous dispersion of $SiO_2$ nanoparticles (colloidal silica) to paint formulations has been shown to provide significant improvement in DPUR, but at the expense of chalking and color fading. Accordingly, it would be an advantage in the art of exterior coating formulations to achieve excellent durability and color retention in addition to DPUR.

SUMMARY OF THE INVENTION

The present invention addresses a need in the art by providing a composition comprising an aqueous dispersion of a) 10 to 60 weight percent, based on the weight of the composition, polymer particles having a z-average particle size in the range of from 70 nm to 550 nm and a calculated $T_g$ in the range of from −10° C. to 50° C.; b) 10 to 40 weight percent, based on the dry weight percent of the composition, polymeric organic crosslinked microspheres having a median weight average ($D_{50}$) particle size in the range of from 0.7 μm to 30 μm; and c) colloidal silica particles having a z-average particle size in the range of from 5 nm to 150 nm; wherein the weight-to-weight ratio of the colloidal silica particles to the polymer particles is in the range of from 5:95 to 35:65. The composition of the present invention is useful in the preparation of architectural coatings formulations with high dirt pick-up resistance and excellent durability.

DETAILED DESCRIPTION OF THE INVENTION

The present invention is a composition comprising an aqueous dispersion of a) 10 to 60 weight percent, based on the weight of the composition, polymer particles having a z-average particle size in the range of from 70 nm to 550 nm and a calculated $T_g$ by the Fox equation in the range of from −10° C. to 50° C.; b) 10 to 40 weight percent, based on the dry weight percent of the composition, polymeric organic crosslinked microspheres having a median weight average ($D_{50}$) particle size in the range of from 0.7 μm to 30 μm; and c) colloidal silica particles having a z-average particle size in the range of from 5 nm to 150 nm; wherein the weight-to-weight ratio of the colloidal silica particles to the polymer particles is in the range of from 5:95 to 35:65.

The polymer particles may be acrylic, styrene acrylic, or vinyl ester polymer particles. Preferably the polymer particles are acrylic polymers having a z-average particle size in the range of from about 70 nm to 300 nm, as measured by dynamic light scattering. The acrylic polymer particles comprise at least 40, preferably at least 60, more preferably at least 80, and most preferably at least 90 weight percent structural units of one or more methacrylate monomers such as methyl methacrylate and ethyl methacrylate, and/or one or more acrylate monomers such as ethyl acrylate, butyl acrylate, 2-propylheptyl acrylate, and 2-ethylhexyl acrylate.

As used herein, the term "structural unit" of the named monomer refers to the remnant of the monomer after polymerization. For example, a structural unit of methyl methacrylate is as illustrated:

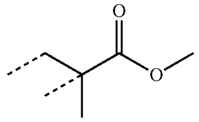

structural unit of methyl methacrylate where the dotted lines represent the points of attachment of the structural unit to the polymer backbone.

The polymer particles, preferably the acrylic polymer particles, may also comprise from 0.1 to 10 weight percent structural units of ethylenically unsaturated carboxylic acid monomers such as methacrylic acid, acrylic acid, and itaconic acid, or salts thereof; or phosphorus acid monomers such as 2-phosphoethyl methacrylate (PEM).

The polymer particles, preferably the acrylic polymer particles, may also include structural units of ancillary monomers such as acrylamide and acrylonitrile, as well as structural units of multiethylenically unsaturated monomers such as allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate.

The polymeric organic crosslinked microspheres have a median weight average particle size ($D_{50}$) in the range of from 0.7 μm, preferably from 1 μm, more preferably from 2 μm, and most preferably from 4 μm, to 30 μm, to preferably 20 μm, more preferably to 13 μm, and most preferably to 10 μm, as measured using a Disc Centrifuge Photosedimentometer (DCP). These organic polymeric microspheres are characterized by being non-film-forming and preferably having a low $T_g$ crosslinked core, that is, a crosslinked core having a $T_g$, as calculated by the Fox equation, of not greater than 25° C., more preferably not greater than 15° C., and more preferably not greater than 10° C.

The crosslinked core of the polymeric organic crosslinked microspheres preferably comprises structural units of one or more monoethylenically unsaturated monomers whose homopolymers have a $T_g$ of not greater than 20° C. (low $T_g$ monomers) such as methyl acrylate, ethyl acrylate, n-butyl acrylate, and 2-ethylhexyl acrylate. Preferably, the crosslinked low $T_g$ core comprises, based on the weight of the core, from 50, more preferably from 70, more preferably from 80, and most preferably from 90 weight percent, to preferably 99, and more preferably to 97.5 weight percent structural units of a low $T_g$ monoethylenically unsaturated monomer. n-Butyl acrylate and 2-ethylhexyl acrylate are preferred low $T_g$ monoethylenically unsaturated monomers used to prepare the low $T_g$ core.

The crosslinked core further comprises structural units of a multiethylenically unsaturated monomer. The concentration of structural units of the multiethylenically unsaturated monomer in the crosslinked microspheres is preferably in the range of from 1, more preferably from 2 weight percent, to 9, more preferably to 8, and most preferably to 6 weight percent, based on the weight of the core.

The polymeric organic crosslinked microspheres are preferably multistage microspheres comprising a crosslinked core that is clad with high a $T_g$ shell, that is, a shell having a $T_g$ of at least 50° C., more preferably at least 70° C., and most preferably at least 90° C. The shell preferably comprises structural units of monomers whose homopolymers have a $T_g$ greater than 70° C. (high $T_g$ monomers), such as methyl methacrylate, styrene, isobornyl methacrylate, cyclohexyl methacrylate, and t-butyl methacrylate. The high $T_g$ shell preferably comprises at least 90 weight percent structural units of methyl methacrylate.

The polymeric organic crosslinked microspheres, preferably multistage polymeric organic crosslinked microspheres, preferably further comprise, based on the weight of the microspheres, from 0.05 to 5 percent structural units of a polymerizable organic phosphate represented by the structure of Formula I:

I

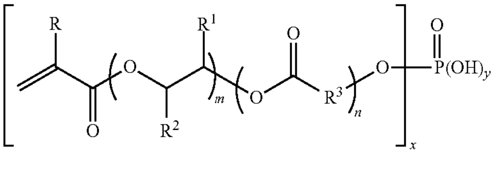

or a salt thereof; wherein R is H or $CH_3$, wherein $R^1$ and $R^2$ are each independently H or $CH_3$, with the proviso that $CR^2CR^1$ is not $C(CH_3)C(CH_3)$; each $R^3$ is independently linear or branched $C_2$-$C_6$ alkylene; m is from 1 to 10; n is from 0 to 5; with the proviso that when m is 1, then n is from 1 to 5; x is 1 or 2; and y is 1 or 2; and x+y=3.

When n is 0, x is 1, and y is 2, the polymerizable organic phosphate or salt thereof is represented by the structure of Formula II:

II

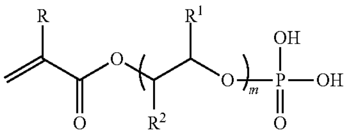

Preferably, each $R^1$ is H, and each $R^2$ is H or $CH_3$; m is preferably from 3, and more preferably from 4; to preferably to 8, and more preferably to 7. Sipomer PAM-100, Sipomer PAM-200 and Sipomer PAM-600 phosphate esters are examples of commercially available compounds within the scope of the compound of Formula II.

Where n is 1; m is 1; R is $CH_3$; $R^1$ and $R^2$ are each H; $R^3$ is $—(CH_2)_5—$; x is 1 or 2; y is 1 or 2; and x+y=3, the polymerizable organic phosphate or salt thereof is represented by the structure of Formula III:

III

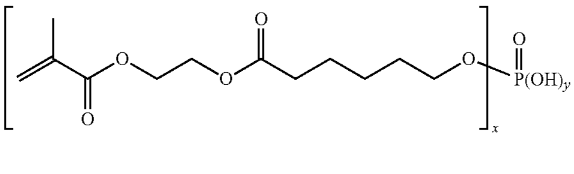

A commercially available compound within the scope of Formula III is Kayamer PM-21 phosphate ester.

The polymeric organic crosslinked microspheres may also comprise 0.05 to 5 weight percent, based on the weight of the microspheres, structural units of an ethylene oxide salt of a distyryl or a tristyryl phenol represented by the structure of Formula IV:

IV

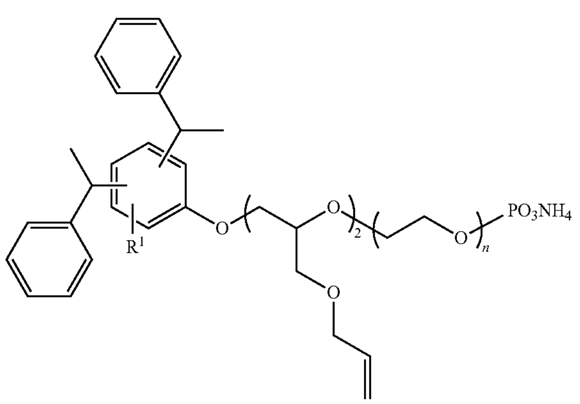

where $R^1$ is H, $CH_2CR{=}CH_2$, $CH{=}CHCH_3$, or 1-phenethyl; R is $C_1$-$C_4$-alkyl; and n is 12 to 18. A commercial example of the structure of Formula IV is E-Sperse RS-1684 reactive surfactant.

The polymeric organic crosslinked microspheres are distinct from opaque polymers, which comprise water-containing cores that form voided polymer particles after application of the dispersion onto a substrate, followed by evaporation.

The composition of the present invention may comprise some level of inorganic extenders such as talc, clay, mica, sericite, $CaCO_3$, nepheline, feldspar, wollastonite, kaolinite, dicalcium phosphate, and diatomaceous earth; however, it is not considered advantageous to include inorganic extenders; accordingly, the weight-to-weight ratio of inorganic extender to polymeric organic multistage crosslinked microspheres is not greater than 1:5, more preferably not greater than 1:10, more preferably not greater than 1:20, and most preferably not greater than 1:100.

The colloidal silica particles preferably have a z-average particle size in the range of from 10 nm to 100 nm, more preferably to 50 nm, and most preferably to 30 nm. The w/w ratio of the colloidal silica particles to polymer particles is preferably in the range of from 10:90, more preferably from 15:85, to preferably 30:70, more preferably to 25:75.

The composition further preferably comprises additional materials such as rheology modifiers, coalescents, surfactants, dispersants, defoamers, biocides, opacifying pigments such as $TiO_2$ and organic opaque polymer particles, colorants, photoinitiators, and neutralizing agents.

The composition of the present invention is useful in coatings compositions for exterior applications. It has been discovered that coatings prepared from formulations containing the composition of the present invention exhibit excellent dirt pick-up resistance and durability.

EXAMPLES

Intermediate Example 1—Preparation of Aqueous Dispersion of Polymer and Colloidal Silica Particles DIRTSHIELD™ 12M Acrylic Binder (199 g, methyl methacrylate/butyl acrylate/methacrylic acid, $T_g$=27° C. as calculated by the Fox equation, 49 wt. % solids, a Trademark of The Dow Chemical Company or its Affiliates), Levasil CS40-113 colloidal silica (density=1.3 g/cm$^3$, specific surface area=130 m$^2$/g, 40 wt. % solids), and AMP-95 neutralizing agent (0.91 g) were mixed together to form Intermediate 1.

Intermediate Example 2—Preparation of Aqueous Dispersion of Polymer and Colloidal Silica Particles DIRTSHIELD™ 12M Acrylic Binder (199 g, 49 wt. % solids), Bindzil CC-401 colloidal silica (density=1.3 g/cm$^3$, average particle size=12 nm, 37 wt. % solids), and AMP-95 neutralizing agent (0.91 g) were combined to form Intermediate 2.

Table 1 illustrates the materials used to prepare paint formulations and their amounts. HEC refers to Natrosol 250HBR Hydroxyethylcellulose; Dispersant refers to OROTAN™ 731A Dispersant; Surfactant refers to TRITON™ DR-16 Surfactant; Defoamer refers to Tego Foamex Defoamer; $TiO_2$ refers to Ti-Pure R-706 $TiO_2$; CC-700 refers to CC-700 Calcium Carbonate Inorganic Extender; Microspheres refers to the aqueous dispersion of polymeric organic crosslinked microspheres prepared as described in US 2018/327,562, Example 1 ($D_{50}$ particle size=8.4 μm); Acrylic Binder refers to DIRTSHIELD™ 12M Acrylic Binder; Opaque Polymer refers to ROPAQUE Ultra E Opaque Polymer; RM-2020 NPR refers to ACRYSOL™ RM-2020 NPR; RM-8W refers to ACRYSOL™ RM-8W; and Biocide refers to Rocima Biocide.

TABLE 1

Paint Formulations

| | Examples | | | | |
|---|---|---|---|---|---|
| | Comp. 1 | Comp. 2 | Comp. 3 | Ex. 1 | Ex. 2 |
| **Grind Stage** | | | | | |
| Water | 110.0 | 110.0 | 110.0 | 110.0 | 110.0 |
| HEC | 1.5 | 1.5 | 1.5 | 1.5 | 1.5 |
| AMP-95 | 0.5 | 0.50 | 0.5 | 0.50 | 0.50 |
| Propylene Glycol | 20.0 | 20.0 | 20.0 | 20.0 | 20.0 |
| Dispersant | 12.32 | 11.04 | 12.32 | 11.04 | 11.04 |
| Surfactant | 1.00 | 1.00 | 1.00 | 1.00 | 1.00 |
| Defoamer | 0.50 | 0.50 | 0.50 | 0.50 | 0.50 |
| $TiO_2$ | 160 | 160 | 160 | 160 | 160 |
| CC-700 | 148 | 148 | — | — | — |
| Total Grind | 453.8 | 452.5 | 305.8 | 304.5 | 304.5 |
| **Let-Down stage** | | | | | |
| Microspheres | 0.0 | 0.0 | 140.0 | 140.0 | 140.0 |
| Acrylic Binder | 367.0 | — | 367.0 | — | — |
| Intermediate 1 | — | 394.0 | — | 394.0 | — |
| Intermediate 2 | — | — | — | — | 394.0 |
| Texanol | 21.58 | 36.00 | 21.58 | 36.00 | 36.00 |
| Opaque Polymer | 20.36 | 20.00 | 20.36 | 20.00 | 20.00 |
| Defoamer | 0.50 | 0.50 | 0.50 | 0.50 | 0.50 |
| RM-2020 NPR | 2.00 | 2.00 | 2.00 | 2.00 | 2.00 |
| RM-8W | 2.40 | 1.80 | 2.40 | 1.40 | 1.40 |
| Biocide | 10.00 | 10.00 | 10.00 | 10.00 | 10.00 |
| Water | 122.00 | 83.00 | 130.00 | 92.00 | 92.00 |
| Total Grind + Let-Down | 1000 | 1000 | 1000 | 1000 | 1000 |

Accelerated Weather Test Method for Durability

Blue paints tinted with phthlaocyanine colorant (3.1% v/v) were prepared and 150-μm wet films were drawn down onto aluminum panels using an applicator. The films were cured over 7 d, after which time initial $L_0$*, $a_0$*, $b_0$* values were measured using a BYK Gardner Color-guide sphere spectrophotometer before the samples were placed in a QUV test instrument (Q-Lab Corp., 340 nm light source UVA with 0.77 w/m$^2$ irradiance intensity) with the test area facing inward. Each QUV cycle consisted of an 8-h UV irradiation at 60° C. followed by a 4-h water spray at 50° C. L*, a*, b* measurement and surface changes were recorded every cycle for each panel.

ΔE* was calculated by the following formula:

$$\Delta E^* = \sqrt{(L_1^* - L_0^*)^2 + (a_1^* - a_0^*)^2 + (b_1^* - b_0^*)^2}$$

Table 2 illustrates the durability ranking for the various coatings, with 10 being the most durable. A durability ranking of 9 or 10 was considered a passing rating.

TABLE 2

Durability Ranking

| QUV A (h) | ΔE* | Rank |
|---|---|---|
| 1500 | ≤2.0 | 10 |
| 1500 | ≤3.0 | 9 |
| 1500 | ≤4.0 | 8 |
| 1000 | ≥2.0 | 7 |
| 1000 | ≥3.0 | 6 |
| 1000 | ≥8.0 | 5 |
| 1000 | ≥6.0 | 4 |
| 500 | ≥2.0 | 3 |
| 500 | ≥3.0 | 2 |
| 500 | ≥4.0 | 1 |

Table 3 illustrates the durability for each of the paints tested.

TABLE 3

Durability Ranking for Tested Samples

| | Description | Durability |
|---|---|---|
| Comp. 1 | DS-12M | 5 |
| Comp. 2 | Hybrid binder A | 6 |
| Comp. 3 | DS-12M + durable matte beads | 10 |
| Example 1 | Hybrid A + durable matte beads | 9 |
| Example 2 | Hybrid B + durable matte beads | 10 |

The durability tests indicated that Comparative Example 3 paint and Example paints 1 and 2 all passed, while Comparative Example paints 1 and 2 failed.

Outdoor Exposure Test

A primer was applied onto cement panels then allowed to cure for 2 h. Each paint was initially applied to the primed cement panels and allowed to cure for 2 h. Then the paints were applied again and allowed to cure overnight. Initial Y and L*, a*, b* values were recorded, after which time the panels were exposed outside with a southerly exposure and set at an angle of 45°. Y and L*, a*, b* values and changes in appearance were recorded every month. The dirt pickup resistance ($D_c$) value trend was recorded; $D_c$=L*/$L*_0$. The higher the $D_c$ the better the dirt pickup resistance. Table 4 illustrates the De trends at 1, 2, and 6 months. A $D_c$ at 6 months of >95% was considered acceptable.

TABLE 4

| $D_c$ Trends for Tested Samples | | | |
|---|---|---|---|
| Examples | 1 m | 2 m | 6 m |
| Comp. 1 | 97.8% | 97.0% | 94.8% |
| Comp. 2 | 99.0% | 99.0% | 97.3% |
| Comp. 3 | 97.3% | 96.7% | 94.5% |
| Example 1 | 99.0% | 99.0% | 97.0% |
| Example 2 | 99.3% | 99.2% | 97.4% |

Table 4 shows that Comparative Example 2 and Examples 1 and 2 showed acceptable dirt pickup resistance, while Comparative Examples 1 and 3 failed. The results show that only formulations that contained both polymeric organic crosslinked microspheres and colloidal silica particles exhibited acceptable durability and dirt pickup resistance.

The invention claimed is:

1. A composition comprising an aqueous dispersion of a) 10 to 60 weight percent, based on the weight of the composition, polymer particles having a z-average particle size in the range of from 70 nm to 550 nm and a calculated $T_g$ in the range of from −10° C. to 50° C.; b) 10 to 40 weight percent, based on the dry weight percent of the composition, polymeric organic crosslinked microspheres having a median weight average ($D_{50}$) particle size in the range of from 0.7 μm to 30 μm; and c) colloidal silica particles having a z-average particle size in the range of from 5 nm to 150 nm; wherein the weight-to-weight ratio of the colloidal silica particles to the polymer particles is in the range of from 5:95 to 35:65.

2. The composition of claim 1 wherein the polymer particles are acrylic polymer particles having a z-average particle size in the range of from 70 nm to 300 nm; wherein the acrylic polymer particles comprise at least 60 weight percent structural units of one or more methacrylate and one or more acrylate monomers; wherein the colloidal silica particles have a z average particle size in the range of from 10 nm to 50 nm.

3. The composition of claim 2 wherein the weight-to-weight ratio of the colloidal silica particles to the polymer particles is in the range of from 10:90 to 30:70; wherein the $D_{50}$ particle size of the organic crosslinked microspheres is in the range of from 2 μm to 20 μm; and wherein the acrylic polymer particles comprise at least 80 weight percent structural units of a combination of methyl methacrylate and one or more acrylate monomers selected from the group consisting of ethyl acrylate, butyl acrylate, 2 propylheptyl acrylate, and 2 ethylhexyl acrylate.

4. The composition of claim 3 which optionally comprises inorganic extender, wherein the weight-to-weight ratio of inorganic extender to polymeric organic crosslinked microspheres is not greater than 1:5.

5. The composition of claim 4 wherein the weight-to-weight ratio of inorganic extender to polymeric organic crosslinked microspheres is not greater than 1:20.

6. The composition of claim 1 wherein the polymeric organic crosslinked microspheres further comprise, based on the weight of the microspheres, either a) from 0.05 to 5 percent structural units of a polymerizable organic phosphate represented by the structure of Formula I:

I

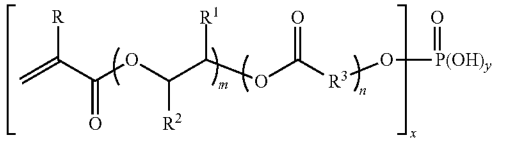

or a salt thereof; wherein R is H or $CH_3$, wherein $R^1$ and $R^2$ are each independently H or $CH_3$, with the proviso that $CR^2CR^1$ is not $C(CH_3)C(CH_3)$; each $R^3$ is independently linear or branched $C_2$-$C_6$ alkylene; m is from 1 to 10; n is from 0 to 5; with the proviso that when m is 1, then n is from 1 to 5; x is 1 or 2; and y is 1 or 2; and x+y=3; or b) from 0.05 to 5 weight percent, based on the weight of the microspheres, structural units of an ethylene oxide salt of a distyryl or a tristyryl phenol represented by the structure of Formula IV:

IV

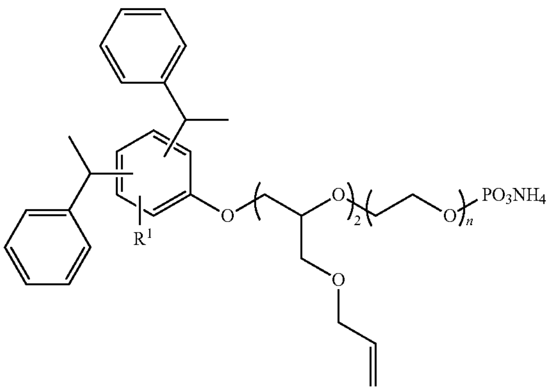

where $R^1$ is H, $CH_2CR{=}CH_2$, $CH{=}CHCH_3$, or 1-phenethyl; R is $C_1$-$C_4$-alkyl; and n is 12 to 18.

7. The composition of claim 1 which further comprises one or more materials selected from the group consisting of rheology modifiers, coalescents, surfactants, dispersants, defoamers, biocides, $TiO_2$ and organic opaque polymer particles, photoinitiators, and colorants.

* * * * *